United States Patent [19]
Ward et al.

[11] 3,800,535
[45] Apr. 2, 1974

[54] HYDROSTATIC TRANSMISSION CONTROL SYSTEM

[75] Inventors: Harold R. Ward, Marshall; Edwin D. Hicks, Battle Creek, both of Mich.

[73] Assignee: Eaton Corporation, Cleveland, Ohio

[22] Filed: Feb. 7, 1973

[21] Appl. No.: 330,423

[52] U.S. Cl............... 60/427, 60/445, 60/490, 91/372, 180/6.48
[51] Int. Cl............................................. F16h 39/46
[58] Field of Search ............ 60/420, 427, 445, 490, 60/491, 492; 91/372, 373; 180/6.48

[56] References Cited
UNITED STATES PATENTS
| | | | |
|---|---|---|---|
| 3,157,998 | 11/1964 | Harris | 60/492 X |
| 3,217,822 | 11/1965 | Ross | 180/6.48 |
| 3,540,220 | 11/1970 | Lauck | 60/427 X |

*Primary Examiner*—Edgar W. Geoghegan
*Attorney, Agent, or Firm*—Teagno & Toddy

[57] ABSTRACT

An improved hydrostatic transmission control system includes a speed control valve which facilitates inching or creep control by effecting a relatively small change in the output speed of a hydrostatic transmission with each increment of movement of a control rod or member during low speed operation of a vehicle. During high speed operation of the vehicle, each increment of movement of the control rod results in a relatively large change in the output speed of the hydrostatic transmission. To obtain the different changes in hydrostatic transmission output speed with equal increments of movement of the control rod, the speed control valve includes a valve spool which is biased against movement relative to the control rod by springs having different spring rates or stiffnesses. During low speed operation of the vehicle, incremental movement of the control rod relative to the valve spool compresses a relatively weak spring to provide a small increase in the biasing force applied against the valve spool. However, during high speed operation of the vehicle, incremental movement of the control rod relative to the valve spool compresses only a relatively strong spring to provide a relatively large increase in the biasing force applied against the valve spool.

7 Claims, 7 Drawing Figures

CONTROL ROD TRAVEL — (IN.)

3,800,535

HYDROSTATIC TRANSMISSION CONTROL SYSTEM

BACKGROUND OF THE INVENTION

The present invention relates to a hydrostatic transmission control system having an improved speed control valve.

A known hydrostatic transmission drive arrangement includes a pair of hydrostatic transmissions which are utilized to vary the drive ratio between an engine and the tracks of a vehicle. A speed or master control valve is selectively actuatable to vary control fluid pressure which is conducted to pressure responsive actuator assemblies associated with the hydrostatic transmissions to simultaneously vary the input to output speed ratios of the hydrostatic transmissions and the speed at which the vehicle moves over the ground. Steering control valves are associated with the hydrostatic transmissions to effect separate operation of the actuator assemblies to vary the input to output speed ratios of the associated hydrostatic transmissions and a turning of the vehicle. One such control system is disclosed in U.S. application, Ser. No. 248,498, filed Apr. 28, 1972 by Harold R. Ward and entitled Control Valve.

The speed or master control valve of this known hydrostatic transmission steering control system is similar to the one disclosed in U.S. Pat. No. 3,540,220 and includes a pair of valve spool biasing springs having the same spring rate. This known speed control valve effects a variation in the output speed of a hydrostatic transmission as a direct function of variations in the position of a control rod. Therefore, an increment of movement of the control rod during low speed operation of the vehicle varies the output speed of the hydrostatic transmission by substantially the same amount as does an equal increment of movement of the control rod during high speed operation of the vehicle.

Due to the fact that the output speed of the hydrostatic transmission is varied by the same amount during both high and low speed vehicle operation in response to equal increments of movement of the control rod, difficulty may be encountered in obtaining precise speed control during low speed operation. Precise low speed control is frequently necessary when operations requiring inching or creeping are being performed. This is due to the fact that during inching of a vehicle, even a small change in the output speed of a hydrostatic transmission effects a relatively large percentage change in the speed of the vehicle.

If the speed control valve disclosed in U.S. Pat. No. 3,540,220 was constructed so that each increment of movement resulted in a relatively small change in the output speed of the hydrostatic transmission to provide good low speed or inching control, the speed control valve would have a non-responsive feed at relatively high speeds. This is because at high speeds the same relatively small change in output speed of the hydrostatic transmission would be obtained with each increment of movement of the control rod. Of course, at high speeds the small variation in the output speed of the hydrostatic transmissions would effect a very small percentage change in the total output speed of the vehicle.

SUMMARY OF THE PRESENT INVENTION

The present invention provides an improved hydrostatic transmission speed control valve which effects a relatively small change in the output speed of a hydrostatic transmission in response to an increment of movement of a control member during the low speed operation of a vehicle. However, during high speed operation of the vehicle, an equal increment of movement of the control member results in a relatively large variation in the output speed of the hydrostatic transmission. By providing for different variations in the output speeds of the hydrostatic transmissions with incremental movement of the control rod at high and low speeds, improved low speed handling or inching control characteristics are obtained without sacrificing high speed responsiveness to movement of the control rod or handle.

To obtain the desired high and low speed operating characteristics, the speed control valve includes a valve spool which is movable from an actuated position to an unactuated position against the influence of biasing springs having different spring rates. Thus during low speed operation of the vehicle, a relatively weak biasing spring is compressed during an incremental movement of the control member relative to the valve spool. This enables the valve spool to be moved back to the unactuated position against the influence of the biasing spring under the influence of a relatively small change in feedback pressure after a relatively small change in output speed has been effected. During high speed operation of the vehicle, a relatively stiff or strong biasing spring is compressed during incremental movement of the control rod relative to the valve spool. Therefore, a relatively large increase in the feedback pressure is required to move the valve spool back to the unactuated position against the influence of the stiffer biasing spring.

Accordingly, it is an object of this invention to provide a new and improved speed control valve which effects a relatively small change in the output speed of a hydrostatic transmission with each increment of movement of a control member during low speed operation of a vehicle and which effects a relatively large change in the output speed of a hydrostatic transmission with each increment of movement of a control member during high speed rotation of the vehicle.

Another object of this invention is to provide a new and improved hydrostatic transmission control system in accordance with the next preceding object and wherein the speed control valve includes springs of different rates or stiffnesses.

Another object of this invention is to provide a new and improved hydrostatic transmission control system having a speed control valve with a valve member which is movable from an actuated position porting fluid under pressure to a pressure responsive control motor to effect an increase in the output speed of a hydrostatic transmission and an unactuated position in which the valve member restricts the flow of fluid to the control motor to maintain the output speed of the hydrostatic transmission substantially constant and wherein the valve member is movable from the actuated position to the unactuated position against the influence of a relatively weak biasing spring when the hydrostatic transmission has a relatively low output speed and is movable from the actuated position to the unactuated position against the influence of a relatively strong biasing spring when the hydrostatic transmission has a relatively high output speed.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE PREFERRED EMBODIMENT

Figure 1:
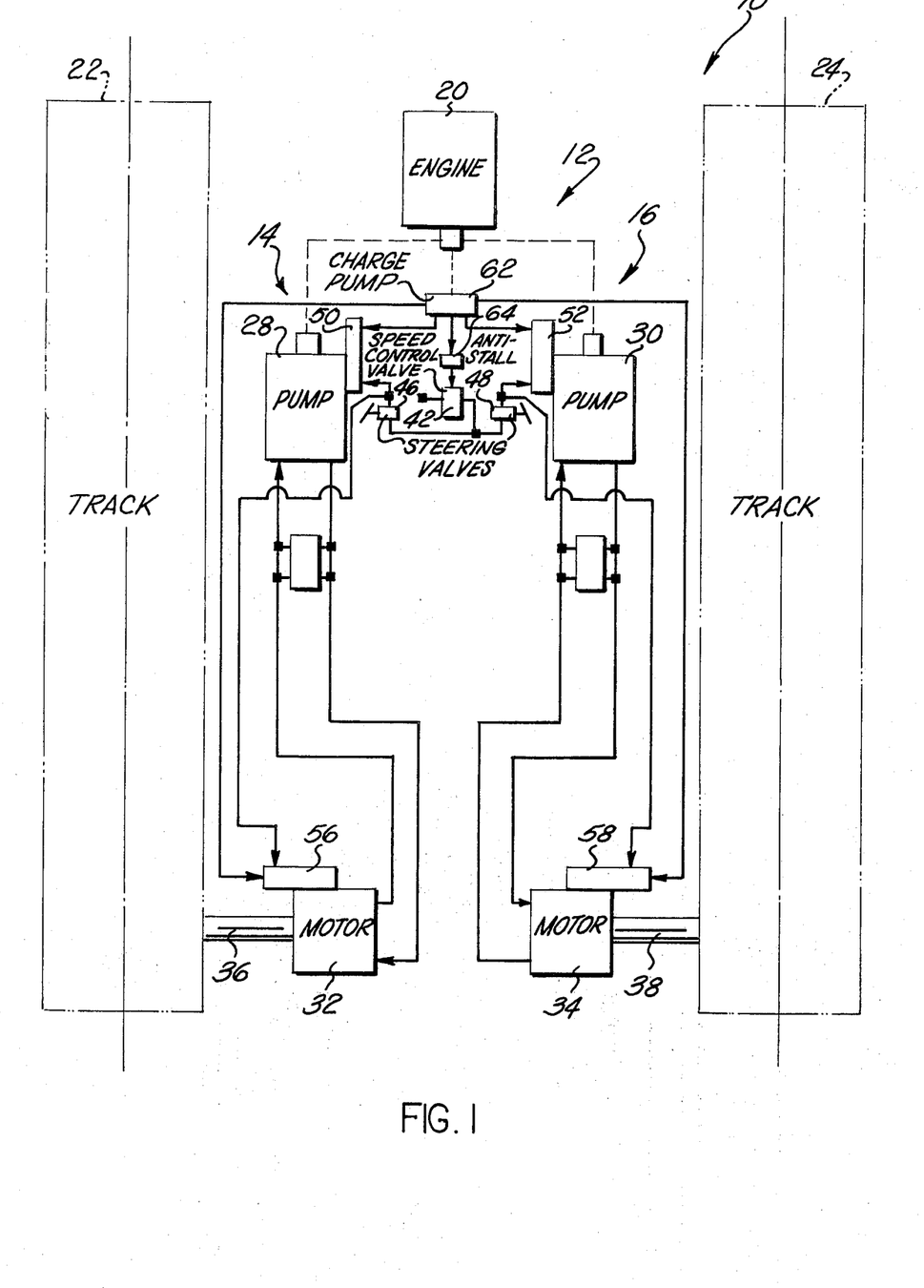
FIG. 1 is a schematic illustration of a vehicle having a hydrostatic transmission drive system with a speed control valve constructed in accordance with the present invention.

A vehicle 10 having a hydrostatic transmission drive system 12 is illustrated in FIG. 1. The hydrostatic transmission drive system 12 includes left and right hand hydrostatic transmission 14 and 16 which transmit drive forces from a common engine or prime mover 20 to left and right tracks 22 and 24 of the vehicle 10. The hydrostatic transmission 14 and 16 include variable displacement pump units 28 and 30 which are driven by the engine 20 to transmit fluid under pressure to variable displacement motor units 32 and 34 which are drivingly connected with the tracks 22 and 24 by drive shafts 36 and 38.

When the vehicle 10 is being driven along a straight path, the input and output speed ratios of the hydrostatic transmissions 14 and 16 are simultaneously changed by equal amounts upon operation of a speed control or pressure regulator valve 42 constructed in accordance with the present invention. The speed control valve 42 is connected with the hydrostatic transmissions through steering control valves 46 and 48.

Assuming that the vehicle 10 is moving forwardly along a straight path at a relatively slow speed, the speed control valve 42 can be operated to increase the control fluid pressure transmitted through the steering valves 46 and 48 to pressure responsive fluid motors in pump actuator assemblies 50 and 52. The increase in control fluid pressure activates the pump actuator assemblies 50 and 52 to increase the effective displacement of the pump units 28 and 30 by equal amounts and thereby increase the forward speed at which the tracks 22 and 24 are driven. If the speed control valve 42 is operated to a sufficient extent, motor actuator assemblies 56 and 58 will decrease the effective displacement of the associated motor units 32 and 34 by equal amounts to further increase the speed at which the tracks 22 and 24 are driven.

If it is desired to turn the vehicle 10 toward either the left or the right, one of the steering control valves 46 or 48 is actuated to reduce the output speed of the hydrostatic transmission 14 or 16 connected with the track 22 or 24 on the side toward which the vehicle is to turn. Thus, if the vehicle is to be turned toward the left, the steering control valve 46 is actuated to reduce the output speed of the hydrostatic transmission 14 and the speed of movement of the track 22 relative to the hydrostatic transmission 16 and track 24. Similarly, if the vehicle is to be turned toward the right, the steering control valve 48 is actuated to reduce the output speed of the hydrostatic transmission 16 and the speed of the track 24.

The construction of the pump and motor actuator assemblies and the manner in which they are connected with the speed control valve 42 is the same as is disclosed in application, Ser. No. 248,685, filed Apr. 28, 1972 by Edward J. Bojas and Harold R. Ward and entitled Hydrostatic Transmission Drive System. The disclosure in the Bojas and Ward application of the construction of the pump and motor actuator assemblies and their relationship with speed and steering control valves is to be considered as being incorporated herein by this reference thereto.

Control fluid is supplied to the speed control valve 42 from an engine driven charge pump 62 (FIG. 1) through an anti-stall system 64. In the event of an impending overloading of the engine 20, the anti-stall system 64 effects a reduction in the pressure of the control fluid conducted to the speed control valve 42. This results in a reduction in the pressure of the control fluid ported to the pump and motor actuator assemblies 50, 52, 56 and 58 of the hydrostatic transmissions 14 and 16 to effect a corresponding reduction in the output speeds of the hydrostatic transmissions. Although many different types of anti-stall systems could be utilized, it is preferred to use the anti-stall system disclosed in application, Ser. No. 237,086, filed Mar. 22, 1972 by Edward J. Bojas and entitled Hydrostatic Transmission Control System.

In accordance with the present invention, the speed control valve 42 is constructed so that during low speed operation of the vehicle 10 incremental movement of the control member or rod 70 (FIG. 2) effects a relatively small change in the output speeds of the hydrostatic transmissions 14 and 16. However, during high speed operation of the vehicle 10, movement of the control rod 70 through the same incremental distance effects a much larger change in the output speeds of the hydrostatic transmissions 14 and 16. By providing for different variations in the output speeds of the hydrostatic transmissions 14 and 16 with incremental movement of the control rod 70 at high and low operating speeds of the vehicle 10, good low speed or inching control characteristics are obtained without sacrificing high speed responsiveness to movement of the control rod 70.

Figure 2:
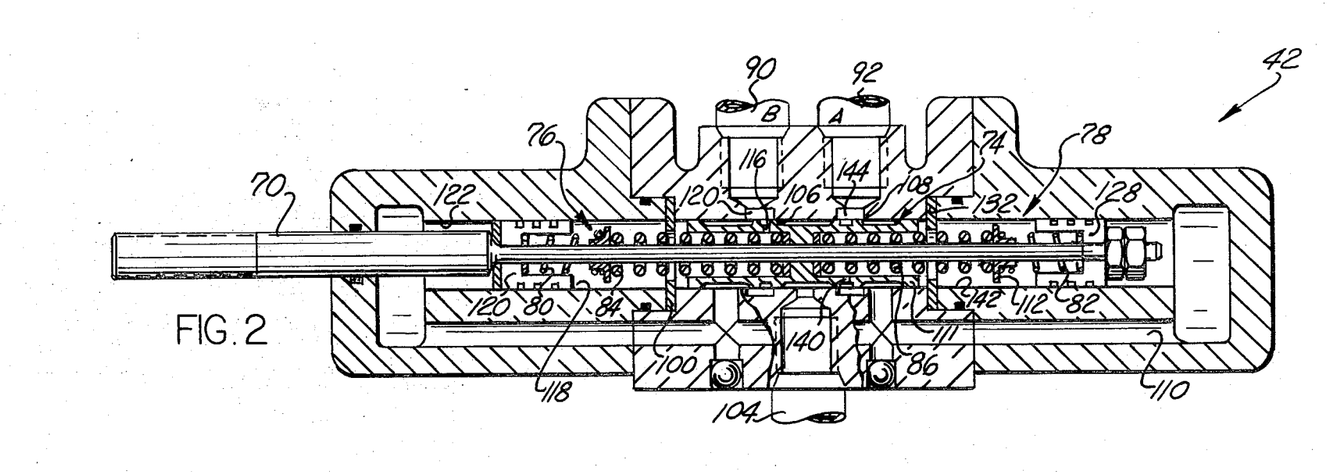
FIG. 2 is a sectional view of the speed control valve in neutral condition.

The speed control valve 42 is of the pressure regulator type and includes a valve spool 74 which is resiliently connected with the control rod 70 by two biasing spring assemblies 76 and 78. To provide for the different variations in output speed with equal increments of movement of the control rod 70 during high and low speed operation of the vehicle, the biasing spring assemblies 76 and 78 include relatively weak biasing springs 80 and 82 which are connected in series with relatively strong biasing springs 84 and 86.

Figure 3:
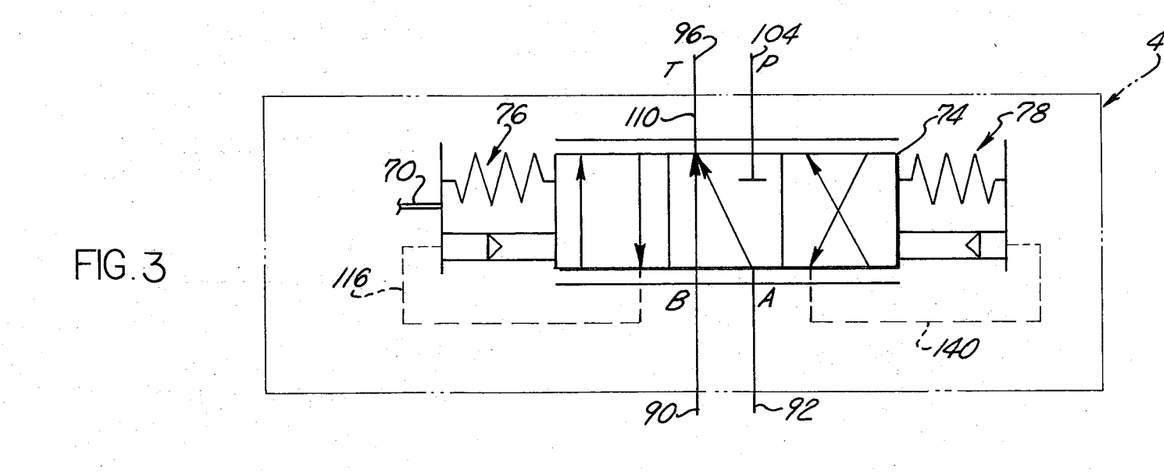
FIG. 3 is a schematic illustration depicting the construction of the speed control valve of FIG. 2.

When the control rod 70 is in the neutral position illustrated in FIG. 2, a pair of fluid conduits 90 and 92 leading to opposite ends of pressure responsive fluid motors in the pump and motor actuator assemblies 50, 52, 56 and 58 are connected with drain through a conduit 96 in the manner illustrated schematically in FIG. 3. When the conduits 90 and 92 are both connected with drain, springs in the pump actuator assemblies 50 and 52 operate pilot valves and feedback linkage to effect movement of the swashplates of the pump units 28 and 30 to minimum displacement positions in the manner disclosed in the aforesaid Bojas and Ward application Ser. No. 248,685, filed Apr. 28, 1972 and entitled Hydrostatic Transmission Drive System. In addition, springs in the motor actuator assemblies 56 and 58 operate pilot valves and feedback linkages to effect movement of the swashplates of the motor units 32 and 34 to maximum displacement positions when the conduits 90 and 92 are both connected with drain. Thun when the control rod 70 and valve spool 74 are in the neutral position illustrated in FIG. 2, the hydrostatic transmission 14 and 16 are ineffective to drive the tracks 14 and 16 and the vehicle 10 remains stationary even though the engine 20 is operating.

Assuming that the vehicle 10 is to be moved forward at a relatively low inching or creeping speed, the control rod 70 is moved through a small distance toward the left (as viewed in FIG. 2). This moves the valve spool 74 from the neutral position of FIG. 2 into abutting engagement with a stop washer 100 (FIG. 4) during initial movement of the control rod 70. Continued movement of the control 70 results in compression of the biasing springs 82 and 86 and axial sliding movement of the control rod 70 relative to the valve spool 74. Since the biasing springs 82 and 86 are connected in series and the biasing spring 86 is stronger than the biasing spring 82, the biasing spring 82 is compressed to a greater extent than the biasing spring 86.

Figure 4:
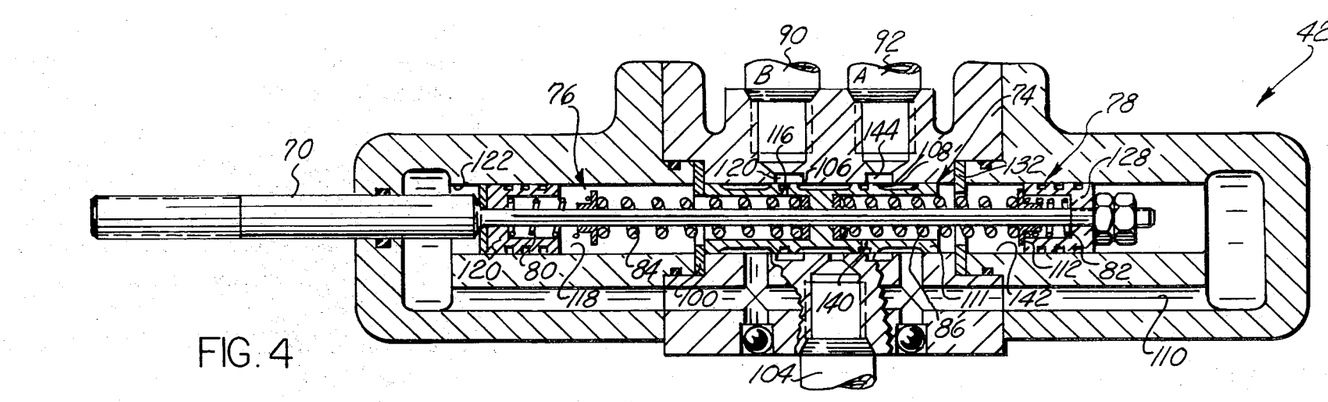
FIG. 4 is a sectional view of a portion of the speed control valve of FIG. 2, the speed control valve being illustrated in a first actuated condition.

In FIG. 4 the control rod 70 has been illustrated in a position corresponding to the upper end of a range of low speed operations of the vehicle 10. It is contemplated that when the vehicle 10 is to be inched or operated at very low speeds, the control rod 70 will be moved through an incremental distance which is equal to only a portion of the distance through which the control rod is moved between the positions of FIGS. 2 and 4. Thus, the spring 82 will be partially compressed rather than fully compressed as shown in FIG. 4 when the control rod 70 is moved through a single incremental distance from the neutral position of FIG. 2.

Movement of the valve spool 74 to the actuated position of FIG. 4 enables fluid under pressure to flow from the charge pump 62 and anti-stall system 64 (FIG. 1) to the conduit 90. Thus, high pressure fluid flows between a pair of annular lands 106 and 108 on the actuated valve spool 74 to the conduit 90. The resulting increase in fluid pressure in the conduit 90 is conducted to one end of the pump actuator assemblies 50 and 52 so that they are activated to increase the displacement of the pump units 28 and 30.

Movement of the valve spool 74 to the actuated position of FIG. 4 also enables fluid to flow from the pump actuator assemblies 50 and 52 to reservoir or drain through the conduit 96. Thus, when the valve spool 74 is in the actuated position of FIG. 4, the conduit 92 is connected with passages 110 leading to the conduit 96 around lands 108 and 111 on the valve spool 74.

Movement of the control rod 70 relative to the valve spool 74 compresses the spring assembly 78 to apply a leftward (as viewed in FIG. 4) biasing force against the valve spool. The spring 82 has a lower spring rate than the spring 86 and is connected in series with the spring 86 through a collar 112 which is slidably disposed on the control rod 70. Therefore, initial compression of the spring assembly 78 results in a relatively slight compression of the stiff spring 86 and a substantial compression of the weak spring 82. Since the weak spring 82 can be readily compressed upon incremental movement of the control rod 70 from the neutral position of FIG. 2, the biasing spring assembly 78 is effective to apply relatively small biasing force against the valve spool 74 urging the valve spool into abutting engagement with the stop washer 100.

As the pump actuator assemblies 50 and 52 are actuated to increase the displacement of the pump units 28 and 30 and the forward speed of the vehicle 10, the fluid pressure in the conduit 90 increases by an amount which is directly proportional to the increase in speed of the vehicle 10 in the forward direction. This increase in pressure in the conduit 90 is transmitted through radially extending passage 116 in the valve spool 74 to a pressure chamber 118 formed between the left end (as viewed in FIG. 4) of the valve spool 74 and a piston 120 which is slidably disposed in cylindrical bore 122. As the feedback pressure in the chamber 118 increases, the valve spool 74 is urged from the actuated position shown in FIG. 4 toward the unactuated position shown in FIG. 5 against the influence of the biasing spring assembly 78.

Figure 5:
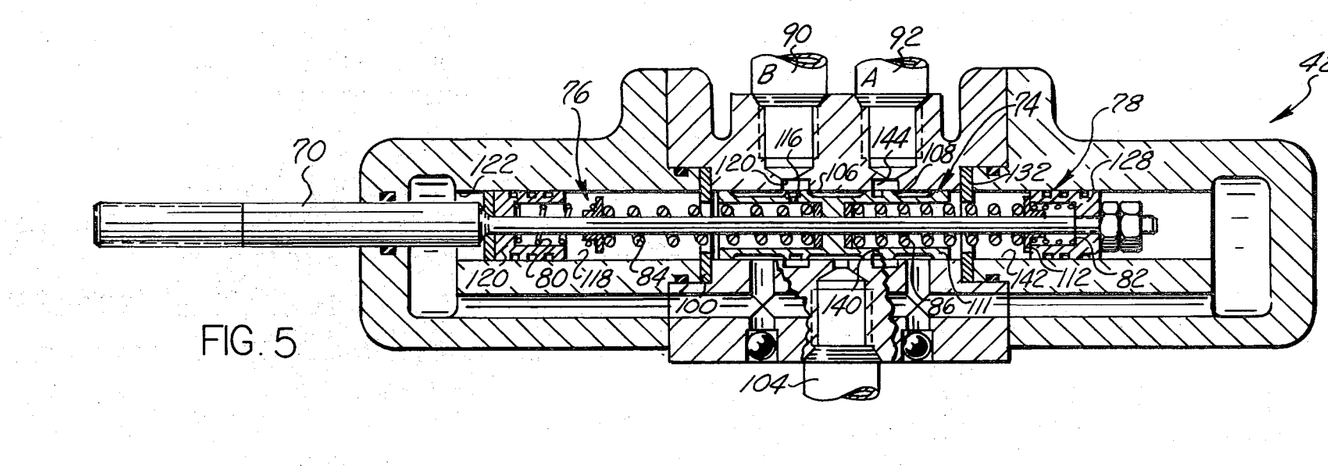
FIG. 5 is a sectional view, similar to FIG. 4, illustrating the speed control valve in an unactuated condition.

Due to the relatively weak spring 82 in the biasing spring assembly 78, only a relatively small increase in feedback pressure is required in the chamber 118 to move the valve spool 74 from the actuated position of FIG. 4 to the unactuated position of FIG. 5. In the unactuated position of FIG. 5, the valve spool 74 restricts fluid flow between the conduit 90 and the fluid supply conduit 104 and drain passage 110 with a modulating action which maintains the pressure in the conduit 90 substantially constant. Thus, when the valve spool 74 is in the unactuated position of FIG. 5 annular land 106 is centered relative to an annular undercut 120. This enables the annular land 106 to restrict fluid flow from the high pressure conduit 104 to the conduit 90. In addition the annular land 106 restricts fluid flow between the conduit 90 and drain passage 110.

The pressure in the conduit 90 is transmitted by the passage 116 to the pressure chamber 118. Therefore if the pressure in the conduit 90 should increase due to excessive fluid flow from the supply conduit 104, the feedback pressure in the chamber 118 increases and moves the valve spool 74 slightly toward the right (as viewed in FIG. 5) to further restrict the flow of fluid from the supply conduit 104 to the conduit 90. If the pressure in the conduit 92 should decrease, the feedback pressure in the chamber 118 decreases to enable the biasing spring assembly 78 to move the valve spool 74 slightly toward the left (as viewed in FIG. 5) to increase the flow of fluid from the supply conduit 104 to the conduit 90. This modulating action maintains the fluid pressure in the conduit 90 and the chamber 118 at a constant pressure which is directly proportional to the extent to which the control rod 70 was moved in compressing the spring assembly 78.

Upon still further movement of the control rod 70 toward the left to further increase the forward speed of the vehicle 10, the biasing spring 82 is further compressed and increases biasing force applied against the valve spool 74. This increased biasing force overcomes the feedback pressure in the chamber 118 and moves the valve spool 74 to the actuated position of FIG. 4. However, the increase in the biasing force applied against the valve spool 74 is relatively small since the spring 82 is relatively weak. Therefore, a relatively small increase in the feedback pressure in the chamber 118 is effective to return the valve spool to the unactuated position of FIG. 5 in opposition to the biasing force exerted by the spring assembly 78. Since spring biased motors in the pump actuator assemblies 50 and 52 are actuated to a relativey small extent by the resulting small increase in pressure in the conduit 90, the displacement of the pumps 28 and 30 and forward speed of the vehicle 10 is increased by a small amount. Of course, the relatively small change in the speed of the vehicle 10 with movement of the control rod 70 facilitates inching or creeping control of the vehicle.

When the vehicle 10 is to be operated at a relatively high speed, the control rod 70 is moved through a distance sufficient to fully compress the weak spring 82 (see FIG. 4). This results in the effective spring rate of the biasing spring assembly 78 being increased from the relatively low spring rate of the series connected springs 82 and 86 to the relatively high spring rate of the stiff spring 86. Thus, movement of the control rod 70 brings the annular collar 112 into abutting engagement with an end face of a piston 128. Further movement of the control rod 70 results in only the relatively strong biasing spring 86 being compressed.

Due to the relatively high spring rate of the biasing spring 86, continued movement of the control rod 70 applies a relatively large biasing force against the valve spool 74 urging it toward the left against the stop washer 100. Since a large biasing force is applied against the valve spool 74 by the spring assembly 78, it is necessary to apply relatively large fluid pressure feedback force in opposition to this biasing force in order to return the valve spool 74 to the unactuated position of FIG. 5. This results in a relatively large increase in the pressure in the conduit 90. Of course, a large increase in the fluid pressure in the conduit 90 results in operation of the pump actuator assemblies 50 and 52 to a relatively large extent to increase the displacement of the pump units 28 and 30 and the forward speed of the vehicle 10 by an amount which is directly proportional to the increase in the fluid pressure in the conduit 90.

Once the relatively weak spring 82 in the spring assembly 78 has been fully compressed (see FIG. 4) each increment of movement of the control rod 70 results in compression of the relatively strong biasing spring 86 and a relatively large increase in the biasing force applied against the valve spool 74. As was previously explained, this results in a relatively large increase in the fluid pressure transmitted through the conduit 90 to the pump actuator assemblies 50 and 52 with a resulting relatively large increase in the forward speed of the vehicle 10. Therefore, during high speed movement of the vehicle 10, movement of the control rod 70 through an incremental distance results in a greater increase in the forward speed of the vehicle 10 than did movement of the control rod 70 through the same incremental distance during low speed operation of the vehicle 10. The transition between relatively high and low speed operation of the vehicle 10 occurs when the weak biasing spring 82 is fully compressed (as shown in FIG. 4).

When the forward speed of the vehicle 10 is reduced from a relatively high operating speed, the control rod 70 is moved through an incremental distance toward the right (as viewed in FIG. 5). This results in movement of the piston 128 away from the valve spool 74 to partially release the spring assembly 78 with a resulting decrease in the biasing force applied to the valve spool 74. The fluid pressure in the chamber 118 is then effective to move the valve spool toward the right from the unactuated position of FIG. 5 to a second actuated position shown in FIG. 6.

Figure 6:
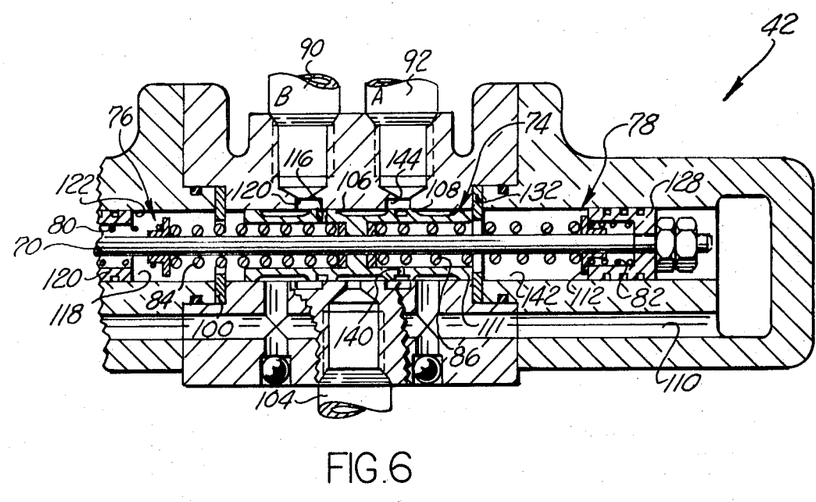
FIG. 6 is a sectional view illustrating the speed control valve in a second actuated condition.

When the valve spool 74 is in a second actuated position of FIG. 6, its right end is pressed against a stop washer 132 under the influence of fluid pressure in the chamber 118 and the conduit 90 is connected in fluid communication with the exhaust or drain passage 110. In addition, the annular valve land 108 has been moved from the position shown in FIG. 5 to the position shown in FIG. 6 to connect the conduit 92 to the fluid supply conduit 104. This results in the pump actuator assemblies 50 and 52 being actuated to decrease the displacement and output speeds of the pump units 28 and 30. As the fluid pressure in the conduit 90 decreases with the resulting decrease in the displacement of the pumps 28 and 30 and forward speed of the vehicle 10, the feedback pressure in the chamber 118 also decreases. As this occurs, the biasing spring assembly 78 moves the valve spool 74 from the second actuated position of FIG. 6 to the unactuated position of FIG. 5. When this has occurred, the land 106 is again effective to modulate the pressure in the conduit 90 and chamber 118 to correspond to the extent of actuation of the control rod 70.

When the speed of the vehicle 10 is decreased from relatively high forward operating speed to a relatively low speed, the weak biasing spring 82 is at least partially relaxed. Thereafter, on each successive increment of movement of the control rod 70 toward the neutral position shown in FIG. 2, the biasing spring 82 is relaxed to decrease the force applied against the valve spool 74 by a relatively small amount. This enables the valve spool 74 to move to the unactuated position of FIG. 5 upon a relatively small decrease in fluid pressure in the conduit 90 and the pressure chamber 118. Of course, the small decrease in the fluid pressure in the conduit 90 results in operation of the pump actuator assemblies 50 and 52 to decrease the displacement of the pump units 28 and 30 by a small amount to therefore effect a correspondingly small decrease in the operating speed of the vehicle 10. When the control rod 70 reaches the neutral position shown in FIG. 2, the valve spool 74 is balanced in the illustrated neutral position blocking fluid flow from the supply conduit 104 to the conduit 90 and connecting the conduit 90 with drain in the manner previously explained.

When the vehicle 10 is to be operated in the reverse direction, the control rod 70 is moved toward the right from the neutral position of FIG. 2. This moves the valve spool 74 rightwardly into engagement with the stop washer 132 (FIG. 6) so that fluid under pressure from the conduit 104 enters the conduit 92. The conduit 90 is connected with the drain conduit 96 by the passages 110.

As the pump actuator assemblies 50 and 52 are operated to increase the reverse displacement of the pump units 28 and 30 and the speed of the vehicle in the reverse direction, the fluid pressure in the conduit 92 increases. This increase in fluid pressure is transmitted through a radially extending passage 140 to a pressure chamber 142 between the piston 128 and the right end of the valve spool 74. As the fluid pressure in the conduit 92 and chamber 142 increases, the valve spool 74 is moved toward the left (as viewed in FIG. 6) against the influence of the biasing spring assembly 76.

A relatively small increase in the pressure fluid in the chamber 142 is necessary to effect the compression of the relatively weak biasing spring 80 and movement of the valve spool 74 to a second unactuated position. It should be noted that this second unactuated position differs from the unactuated position of FIG. 5 in that the land 108 is centered relative to an annular undercut or recess 144 associated with the conduit 92. In addition, the land 106 is disposed to the right of the positon shown in FIG. 2 so that the conduit 90 is connected in communication with the drain passage 110. Upon each successive incremental movement of the control rod 70 toward the right (as viewed in FIG. 2) a small change in the rearward speed of the vehicle 10 is obtained. However, once the relatively weak biasing spring 80 is fully compressed, each increment of movement of the control rod 70 toward the right results in a larger change in the rearward speed of the vehicle 10. Since the conditions resulting from reverse actuation of the speed control valve 42 are merely a reversal of conditions resulting from forward actuation of the speed control valve, reverse operation will not be further described to avoid prolixity of description.

Figure 7:
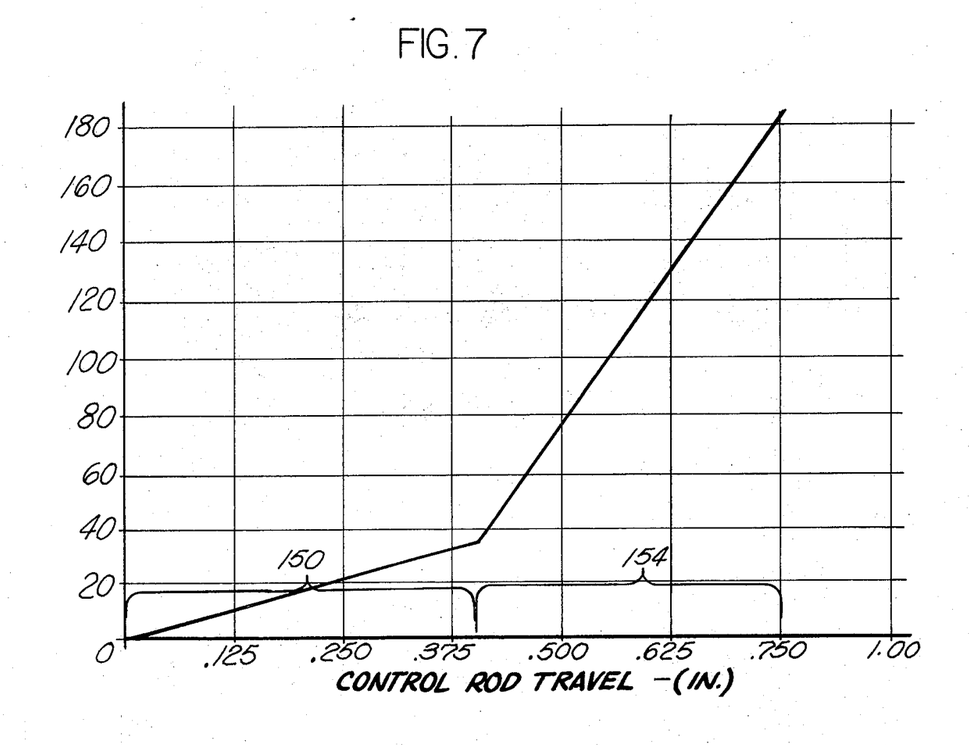
FIG. 7 is a graph illustrating the relationship between control fluid pressure ported to a pressure responsive control motor by the speed control valve and the extent of movement of a control member from an initial or neutral position.

Changes in control fluid pressure ported by the speed control valve 42 to the pump actuator assemblies 50 and 52 is shown in FIG. 7 as a function of the extent of movement of the control rod 70. During low speed forward movement of the vehicle 10, each increment of movement of the control rod 70 in the range indicated at 150 in FIG. 7 results in a relatively small change in the control pressure transmitted through the conduit 90 to the pump actuator assemblies 50 and 52. It should be noted that equal increments of movement of the control rod 70 in the range 150 results in equal changes in the fluid pressure conducted to the pump actuator assemblies 50 and 52 through the conduit 90 and a corresponding change in the forward speed of the vehicle 10.

When the weak biasing spring 82 becomes fully compressed (see FIG. 4) the control rod 70 is moved out of the range 150 into a high speed range of movement indicated at 154 in FIG. 7. The range 154 of movement of the control rod 70 corresponds to high speed operation of the vehicle 10. During high speed operation of vehicle 10, each increment of movement of the control rod 70 results in a relatively large change in the control pressure transmitted from the conduit 90 to the pump actuator assemblies 50 and 52 and a correspondingly relatively large change in the forward speed of the vehicle 10. It should be noted that equal increments of movement of the control rod 70 in the range 154 results in equal changes in the control pressure connected to the pump actuator assemblies 50 and 52 and equal changes in the forward speed of the vehicle 10.

The numerical designations for control fluid pressure and control rod travel shown in FIG. 7 are for purposes of clarity of illustration and will, of course, vary with different embodiments of the invention. However it should be noted that during low speed operation of the vehicle 10, equal incremental movements of the control rod 70 in the range 150 results in relatively small equal changes in control fluid pressure conducted to the pump actuator assemblies 50 and 52. The small changes control fluid pressure effect equal small changes in the forward speed of the vehicle obtained for each equal increment of movement of the control rod 70. During high speed operation of the vehicle 10, the control rod 70 is moved in the range 154. In the high speed range 154, each equal increment of movement of the control rod 70 results in equal relatively large changes in the control fluid pressure conducted to the pump actuator assemblies 50 and 52 and speed of the vehicle 10.

Although the speed control valve 42 has been described herein in connection with only the pump actuator assemblies 50 and 52, it should be understood that the speed control valve 42 is also connected with the motor actuator assemblies 56 and 58. Since the motor actuator assemblies 56 and 58 have relatively stiff springs, they are not actuated during low speed movement of the vehicle 10 and the motors 32 and 34 have a constant relatively large or maximum displacement. However, during high speed operation of the vehicle 10, that is during movement of the control rod 70 through the range 154, the motor actuator assemblies 56 and 58 may be activated to reduce the displacement of the motor units 32 and increase the output speeds of the hydrostatic transmissions 14 and 16.

In view of the foregoing description it is apparent that the hydrostatic transmission speed control valve 42 effects a relatively small change in the output speed of the hydrostatic transmissions 14 and 16 in response to an increment of movement of a control rod during the low speed operation of the vehicle 10. However, during high speed operation of the vehicle 10, an equal increment of movement of the control rod 70 results in a relatively large variation in the output speed of the hydrostatic transmissions 14 and 16. By providing for different variations in the output speeds of the hydrostatic transmissions 14 and 16 with incremental movement of the control rod 70 at high and low speeds, improved low speed handling or inching control characteristics are obtained without sacrificing high speed responsiveness to movement of the control rod.

To obtain the desired high and low speed operating characteristics, the speed control valve 42 includes a valve spool 74 which is movable from the actuated position of FIG. 4 to the unactuated position of FIG. 5 against the influence of biasing springs 82 and 86 having different spring rates and connected in series. Thus during low speed forward operation of the vehicle 10, the relatively weak biasing spring 82 is compressed in response to incremental movement of the control rod 70 relative to the valve spool 74. This enables the valve spool 74 to be moved back to the unactuated position against the influence of the biasing spring 82 under the influence of a relatively small change in feedback pressure in the chamber 118. Of course, this results in a relatively small change in speed of the vehicle 10. During high speed operation of the vehicle 10 a relatively stiff or strong biasing spring 86 is compressed upon incremental movement of the control rod relative to the valve spool 74. Therefore, a relatively large increase in the feedback pressure is required to move the valve spool 74 back to the unactuated position of FIG. 5 against the influence of the stiffer biasing spring 86.

Having described a specific preferred embodiment of the invention, the following is claimed:

1. An apparatus for controlling the operation of a hydrostatic transmission, said apparatus comprising actuator means for varying the output speed of the hydrostatic transmission in response to a variation in control fluid pressure, and control means for regulating the control fluid pressure conducted to said actuator means, said control means including a movable control member and valve means for effecting a relatively small change in the control fluid pressure conducted to said actuator means in response to movement of said control member through a first distance when the hydrostatic transmission has a relatively low output speed and for effecting a relatively large change in the control fluid pressure conducted to said actuator means in response to movement of said control member through a second distance equal to said first distance when the hydrostatic transmission has a relatively high output speed.

2. An apparatus as set forth in claim 1 wherein said valve means includes a first biasing spring having a first spring rate and a second biasing spring having a second spring rate.

3. An apparatus as set forth in claim 1 wherein said valve means includes a valve member which is movable relative to said control member, means for exposing said valve member to a feedback force which varies as a function of variations in control fluid pressure transmitted to said actuator means, and spring means for applying to said valve member a biasing force which varies by a first amount in response to movement of said control member through said first distance and which varies by a second amount which is greater than said first amount in response to movement of said control member through said second distance.

4. An apparatus as set forth in claim 1 wherein said valve means includes a valve member slidably disposed on said control member, and first and second spring means for resisting movement of said valve member relative to said control member, said first spring means having a spring rate which is different than the spring rate of said second spring means.

5. An apparatus for controlling the operation of a hydrostatic transmission, said apparatus comprising actuator means for varying the output speed of the hydrostatic transmission in response to a variation in control fluid pressure, and control means for regulating the control fluid pressure conducted to said actuator means, said control means including a control member, valve means connected with and movable relative to said control member between actuated and unactuated conditions to vary the control fluid pressure conducted to said actuator means, biasing means for effecting operation of said valve means from the unactuated condition to the actuated condition to increase the control fluid pressure conducted to said actuator means in response to movement of said control member, and feedback means for effecting operation of said valve means from the actuated condition to the unactuated condition against the influence of said biasing means in response to an increase in the control fluid pressure, said biasing means including first spring means having a first spring rate and second spring means having a second spring rate which is greater than said first spring rate.

6. An apparatus as set forth in claim 5 wherein said first and second spring means are disposed in a coaxial relationship with said control member.

7. An apparatus for controlling the operation of a hydrostatic transmission, said apparatus comprising means for providing control fluid, actuator means for varying the input to output speed ratio of the hydrostatic transmission in response to variations in control fluid pressure to which said actuator means is exposed, and pressure controller means operable to any one of a plurality of settings to vary the control fluid pressure to which said actuator means is exposed in accordance with variations in the setting of said pressure controller means, said pressure controller means including valve means for varying the control fluid pressure to which said actuator means is exposed, said valve means being operable between an actuated condition varying the control fluid pressure to which said actuator means is exposed and an unactuated condition in which the control fluid pressure to which said actuator means is exposed is maintained substantially constant, manually adjustable control means selectively movable between a plurality of settings for effecting operation of said valve means between the actuated and unactuated conditions to adjust the control fluid pressure to which said actuator means is exposed in response to a change in the setting of said manually adjustable control means, fluid pressure feedback means for urging operation of said valve means from the actuated condition to the unactuated condition under the influence of a fluid pressure force which varies as a function of variations in the control fluid pressure to which said actuator means is exposed, and biasing means for urging said valve means against operation to the actuated condition with a second force which varies in response to variations in the setting of said control means, said biasing means including spring means having one of two different spring rates depending upon the setting of said control means.

* * * * *

UNITED STATES PATENT OFFICE
CERTIFICATE OF CORRECTION

Patent No. 3,800,535          Dated April 2, 1974

Inventor(s) HAROLD R. WARD, ET. AL.

It is certified that error appears in the above-identified patent and that said Letters Patent are hereby corrected as shown below:

Column 1, line 56, "feed" should read -- feel -- .

Column 2, line 44, "rotation" should read -- operation -- .

Column 5, line 21, "Thun" should read -- Thus -- .

Signed and sealed this 13th day of August 1974.

(SEAL)
Attest:

McCOY M. GIBSON, JR.          C. MARSHALL DANN
Attesting Officer               Commissioner of Patents